(12) United States Patent
Stratford

(10) Patent No.: US 8,803,047 B2
(45) Date of Patent: Aug. 12, 2014

(54) INDUCTION HEATING SYSTEMS AND METHODS FOR PRODUCING AN OBJECT HAVING A VARYING HARDNESS ALONG THE LENGTH OF THE OBJECT

(75) Inventor: Lee Stratford, Cheltenham (GB)

(73) Assignee: Ameritherm, Inc., Scottsville, NY (US)

( * ) Notice: Subject to any disclaimer, the term of this patent is extended or adjusted under 35 U.S.C. 154(b) by 544 days.

(21) Appl. No.: 12/967,756

(22) Filed: Dec. 14, 2010

(65) Prior Publication Data

US 2012/0145288 A1   Jun. 14, 2012

(51) Int. Cl.
*C21D 1/09* (2006.01)
*H05B 6/10* (2006.01)

(52) U.S. Cl.
USPC ............................ 219/647; 148/565

(58) Field of Classification Search
CPC .............. C21D 1/10; C21D 1/42; H05B 6/40; H05B 6/101; F42B 33/00
USPC .......................... 148/565; 219/647
See application file for complete search history.

(56) References Cited

U.S. PATENT DOCUMENTS 2,972,947 A   2/1961   Fitzsimmons et al.

FOREIGN PATENT DOCUMENTS

GB   363323 A   6/1930
GB   567304 A   2/1945

OTHER PUBLICATIONS

Search Report issued in corresponding GB Application No. 1121387.3 on Mar. 27, 2012, 3 pages.

*Primary Examiner* — Jianying Atkisson
(74) *Attorney, Agent, or Firm* — Rothwell, Figg, Ernst & Manbeck, P.C.

(57) ABSTRACT

In one aspect, the invention relates to induction heating systems and methods for producing an object having a varying hardness along the length of the object. In some embodiments, the induction heating system comprises a radio frequency (RF) power source and a work coil electrically coupled to the RF power source, wherein the work coil is a helical conical coil.

1 Claim, 4 Drawing Sheets

INDUCTION HEATING SYSTEMS AND METHODS FOR PRODUCING AN OBJECT HAVING A VARYING HARDNESS ALONG THE LENGTH OF THE OBJECT

TECHNICAL FIELD

The invention relates to induction heating applications. In one aspect, the invention relates to induction heating systems and methods for producing an object having a varying hardness along the length of the object.

BACKGROUND

There are applications where it is desirable to produce an object having a varying hardness along the length of the object. For example, there is a requirement in some applications to produce a graduated hardness pattern along the length of a brass cartridge case (a.k.a., "cartridge") from the tip to the base of the cartridge. One process for producing a varying hardness of a cartridge involves multiple steps. In one step, a general hardness is produced over the whole length of the cartridge and is usually done using an oven. In another step, the tip of the cartridge is annealed, and this is usually done using flame heating or induction heating. An advantage of producing a graduated hardness pattern along the length of the cartridge is that allows for an increase in the propellant charge, therefore increasing the muzzle velocity of the ammunition.

What is desired is an improved system and method for producing an object having a varying hardness along the length of the object.

SUMMARY

In one aspect, the invention provides a system for producing a brass cartridge case having a varying hardness along the length of the cartridge case. In some embodiments, the system includes: a radio frequency (RF) power source; a work coil, for receiving the brass cartridge case, electrically coupled to the RF power source; and a cartridge case guide configured to accurately position the brass cartridge case in the work coil, wherein the work coil is a helical conical coil. The cartridge case guide may include a pair of guide rails and/or a case shield. At least a portion of the guide rails and/or case shield may be disposed within the work coil.

In some embodiments, the system also includes: a coil box; and a second work coil, wherein the first work coil and the second work coil are located within the coil box. The first work coil and the second work coil may be connected in parallel with the RF power source. In such embodiments, the system may also include a second cartridge case guide configured to accurately position a second brass cartridge case in the second work coil.

In another aspect, the invention provides a method for producing a brass cartridge case having a varying hardness along the length of the cartridge case. In some embodiments this method includes the following steps: inserting the brass cartridge into a helical conical work coil electrically coupled to an RF power source; using the RF power source to cause an AC current to flow through the work coil for not more than a predetermined amount of time while the brass cartridge is located within the work coil; and removing the brass cartridge from the work coil. The method may also include using a cartridge case guide to position the brass cartridge in the work coil. The cartridge case guide may include a pair of guide rails and/or a case shield.

In some embodiment, the method may also include inserting a second brass cartridge into a second helical conical work coil; and, while the second brass cartridge is located within the second work coil, using the RF power source to cause an AC current to flow through the second work coil for not more than a predetermined amount of time, wherein the first and second work coils are located in a coil box. The first work coil and the second work coil may also be connected in parallel with the RF power source. In some embodiments, the second brass cartridge is inserted into the second work coil at substantially the same time as the first brass cartridge is inserted into the first work coil.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
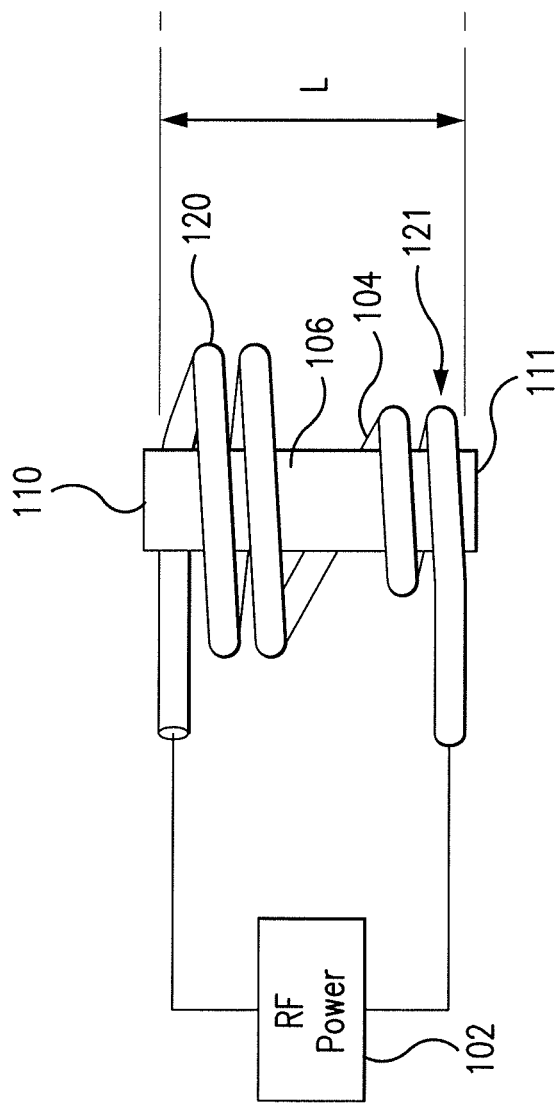
FIG. 1 illustrates a system according to an embodiment of the invention.

Referring now to FIG. 1, FIG. 1 illustrates a system 100, according to an embodiment of the invention, for producing an object 106 having a varying hardness along the length of the object. In this specific embodiment the object 106 is a brass cartridge case having a first end 110 (a.k.a., the open end 110) and a second end 111 (a.k.a., the closed end 111). The closed end 111 is thicker than the open end 110.

As shown in FIG. 1, the system includes a radio frequency (RF) power source for providing an RF alternating current (AC) to an induction coil 104 (a.k.a., the work coil 104). The passage of the AC current through the work coil generates a changing magnetic field in the space within the work coil 104. The cartridge 106 to be heated is placed within the work coil, as shown in FIG. 1, so that the cartridge is exposed to and affected by the changing magnetic field. As shown in FIG. 1, the cartridge 106 should be oriented in the work coil 104 during the heating process such that the open end 110 is positioned somewhere adjacent the first end 120 of the work coil and the closed end 111 is positioned somewhere adjacent the second end 121 of the work coil.

Figure 2:
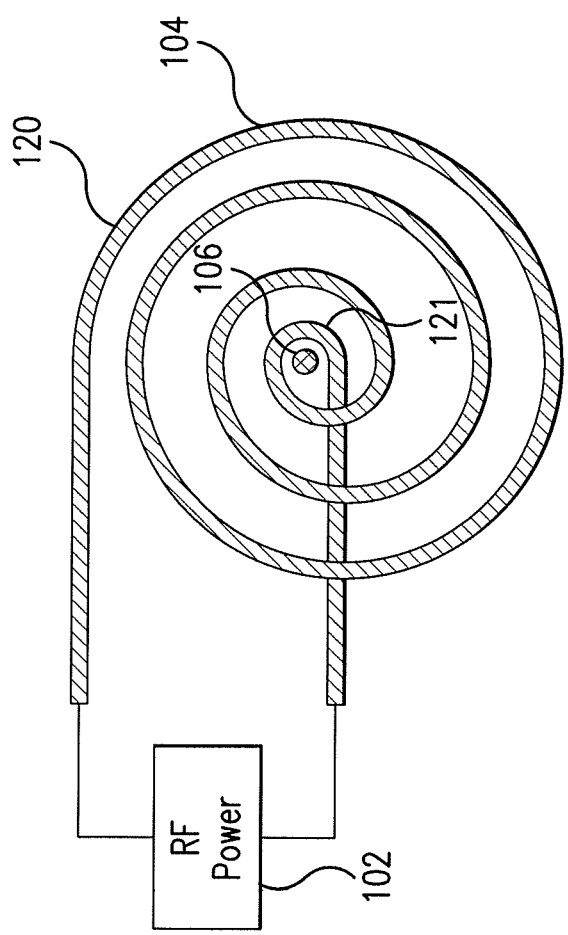
FIG. 2 is a top-view of an induction coil according to an embodiment of the invention.

Referring now to FIG. 2, FIG. 2 is a top-view of the work coil 104. As shown in FIGS. 1 and 2, the work coil 104 has a helical conical form. Because the work coil 104 has such a helical conical form, the diameter of the work coil 104 tapers. That is, the diameter is larger at the first end 120 the coil than at the second end 121 of the coil. In some embodiments, the diameter at end 120 is about 34 millimeters and the diameter at end 121 is about 20 millimeters. In some embodiments the length (L) of the work coil is about 40 millimeters. The helical conical shape of the work coil 104, together with the power and frequency of the energy used during a heating process produces the desired graduated hardness along the length of the cartridge case 106.

Figure 3:
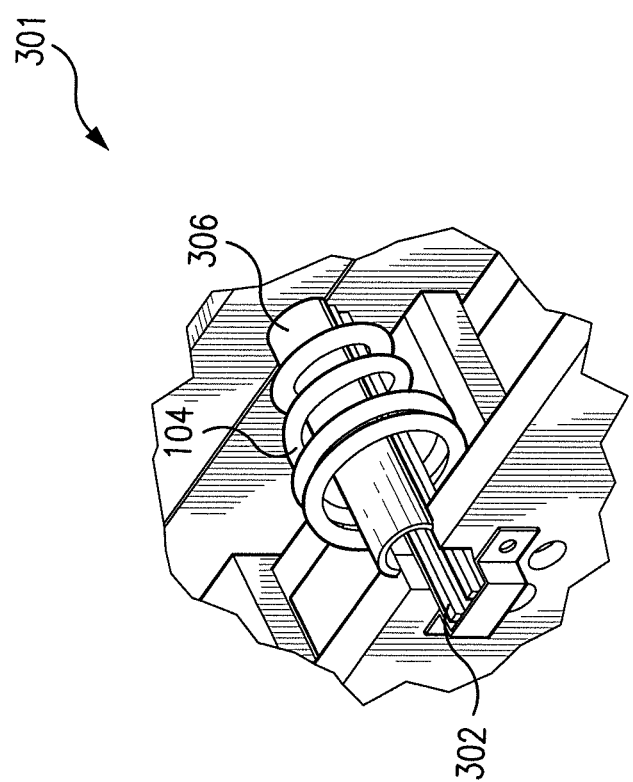
FIG. 3 illustrates an induction coil apparatus according to an embodiment of the invention.

Referring now to FIG. 3, FIG. 3 illustrates a work coil apparatus 301 according to an embodiment of the invention. Coil apparatus 301 includes work coil 104 and also includes a cartridge case guide (e.g., a pair of guide rails 302 and/or a case shield 306) for accurately positioning the cartridge case 106 within the work coil 104. As shown, a portion of guide rails 302 and case shield 306 are positioned within the work coil 104. Because of this, it is preferable that guide rails 302 and case shield 306 are made from materials that are not affected by exposure to a changing magnetic field. In some embodiments, guide rails 302 consist of ceramics and case shield 306 consists of glass (e.g. quartz glass). Guide rails 302 and case shield 306 function to assure the proper positioning of the cartridge case 106 within the work coil 104 during the heating process.

In one particular example, once the cartridge 106 is properly positioned within the work coil 104, the RF power source 102 is used to apply to the work coil 104 an 87 KHz AC current and 560 volt voltage for at most about 1.7 seconds (the ideal current, voltage, and timing will, of course, depend on the properties of the cartridge being heated). In some embodiments, this 1.7 seconds duration of heating is sufficient to produce the desired graduated hardness pattern along the length of the cartridge 106.

Figure 4:
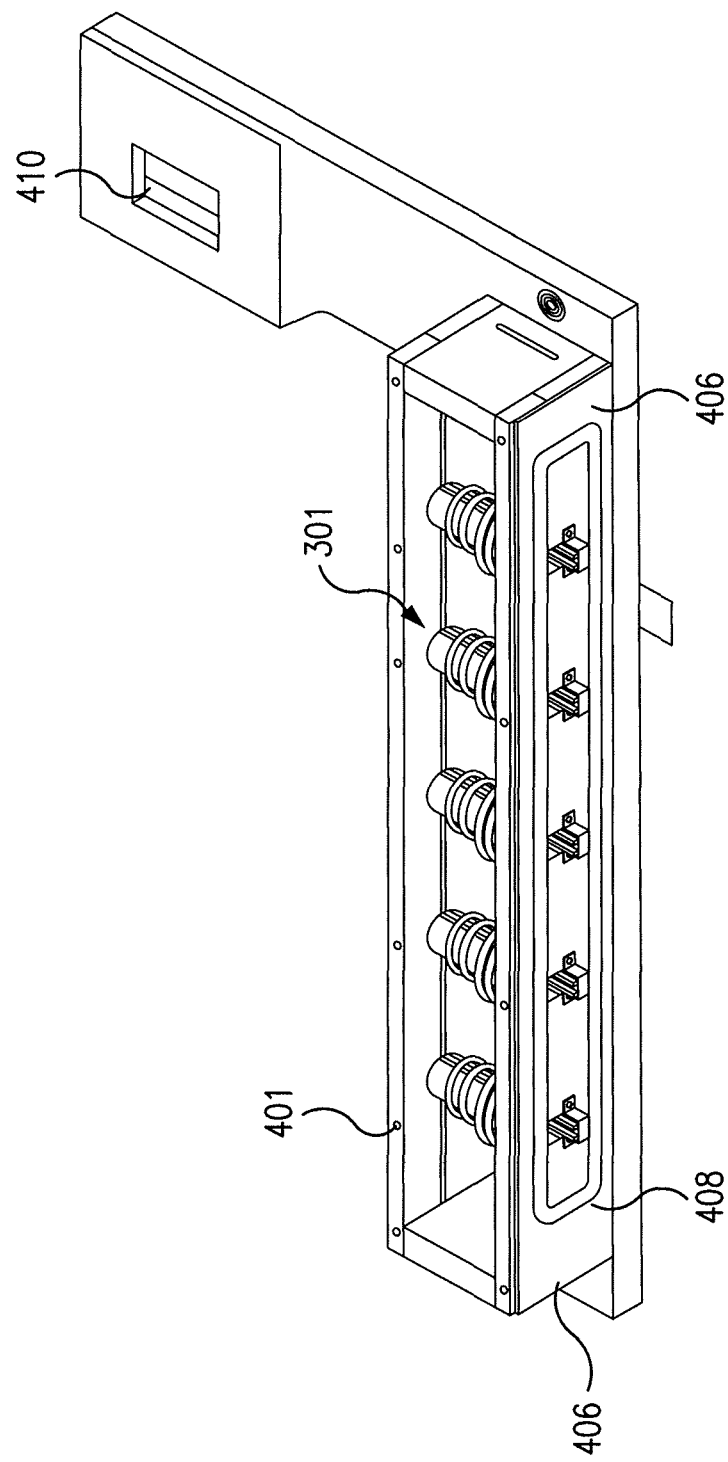
FIG. 4 illustrates a system, according to an embodiment of the invention, for heating a number of objects in parallel.

Referring now to FIG. 4, FIG. 4 illustrates a heating system 400 for heating a number of cartridges 106 in parallel. As shown in FIG. 4, heating system includes a number of coil apparatuses 301. These coil apparatuses 301 are connected in parallel with an RF power source via a connection point 410. As further shown in FIG. 4, the coil apparatuses 301 are positioned within a cavity formed by a four walled coil box 401. The walls of coil box 401 are preferably made from a heat resistant material (e.g., TENMAT's SINDANYO H91 asbestos-free cement board). A copper plate 406 may be attached to the outside surface of a major wall of box 401 (as shown in FIG. 4) to provide magnetic shielding. Additionally, a U shaped cooling tube 408 carrying water may be positioned against the plate 406 to provide cooling. As shown, preferably tube 408 extends nearly the entire length of the plate 406.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A system for producing a brass cartridge case having a varying hardness along the length of the cartridge case, the system comprising:
    a power source;
    a work coil for receiving the brass cartridge case, the work coil being a helical conical coil that is electrically coupled to the power source;
    a guide rail positioned within the work coil; and
    a case shield positioned within the work coil,
    wherein the guide rail and case shield are designed to assure the proper positioning of the cartridge case within the work coil during the heating process, and
    wherein the case shield is in the form of a half pipe that covers only a portion of the outer peripheral surface of the cartridge case when the cartridge case is accurately positioned in the work coil.

* * * * *